United States Patent
Sawyers et al.

(10) Patent No.: US 8,244,870 B2
(45) Date of Patent: Aug. 14, 2012

(54) DISTRIBUTING TRAFFIC TO MULTIPLE GNS DEVICES

(75) Inventors: Gaylon D. Sawyers, Dallas, TX (US); Michael W. Smith, Murphy, TX (US)

(73) Assignee: Raytheon Company, Waltham, MA (US)

( * ) Notice: Subject to any disclaimer, the term of this patent is extended or adjusted under 35 U.S.C. 154(b) by 232 days.

(21) Appl. No.: 12/272,878

(22) Filed: Nov. 18, 2008

(65) Prior Publication Data

US 2010/0125676 A1    May 20, 2010

(51) Int. Cl.
G06F 15/16    (2006.01)
(52) U.S. Cl. .................... 709/226; 709/246; 709/229
(58) Field of Classification Search .................. 709/226, 709/246
See application file for complete search history.

(56) References Cited

U.S. PATENT DOCUMENTS

| | | |
|---|---|---|
| 5,905,890 A | 5/1999 | Seaman et al. ................ 395/704 |
| 6,212,676 B1 | 4/2001 | Seaman et al. .................... 717/4 |
| 6,658,470 B1 | 12/2003 | deBardelaben ................ 709/224 |
| 6,907,608 B1 | 6/2005 | Susser et al. ................... 719/315 |
| 7,181,523 B2* | 2/2007 | Sim .................................. 709/226 |
| 7,395,535 B2 | 7/2008 | Susser et al. ........................ 718/1 |
| 7,509,645 B2* | 3/2009 | Coates et al. ................. 718/105 |
| 2002/0165964 A1* | 11/2002 | Chen et al. .................... 709/226 |
| 2005/0010685 A1* | 1/2005 | Ramnath et al. .............. 709/238 |
| 2007/0022121 A1* | 1/2007 | Bahar et al. ...................... 707/10 |
| 2009/0049263 A1* | 2/2009 | Hara et al. ...................... 711/162 |
| 2009/0106255 A1* | 4/2009 | Lacapra et al. .................. 707/10 |
| 2009/0292734 A1* | 11/2009 | Miloushev et al. ........ 707/104.1 |
| 2010/0057992 A1* | 3/2010 | Hahn et al. .................... 711/115 |
| 2011/0087696 A1* | 4/2011 | Lacapra ........................ 707/769 |

* cited by examiner

Primary Examiner — Djenane Bayard
(74) Attorney, Agent, or Firm — Cantor Colburn LLP

(57) ABSTRACT

In one embodiment, a system for communicating traffic comprises a plurality of global namespace (GNS) devices and a network switch. The GNS devices aggregate mount points of file systems as an aggregated mount point. The network switch has a host-side interface, a storage-side interface, and a load balancer. The host-side interface has one or more host-side ports that communicate with a computing host. The storage-side interface has a plurality of storage-side ports that communicate with the GNS devices. The load balancer presents a virtual address to the computing host, and distributes traffic from the computing host to the GNS devices through the storage-side ports.

20 Claims, 2 Drawing Sheets

DISTRIBUTING TRAFFIC TO MULTIPLE GNS DEVICES

TECHNICAL FIELD

This invention relates generally to the field of information systems and more specifically to distributing traffic to multiple GNS devices.

BACKGROUND

A computing host may access file systems through an arrangement of switches and other devices. The devices may be used to allow the host to use the file systems more quickly and efficiently. In certain situations, known devices do not provide satisfactory performance.

SUMMARY OF THE DISCLOSURE

In accordance with the present invention, disadvantages and problems associated with previous techniques for distributing traffic may be reduced or eliminated.

In one embodiment, a system for communicating traffic comprises a plurality of global namespace (GNS) devices and a network switch. The GNS devices aggregate mount points of file systems as an aggregated mount point. The network switch has a host-side interface, a storage-side interface, and a load balancer. The host-side interface has one or more host-side ports that communicate with a computing host. The storage-side interface has a plurality of storage-side ports that communicate with the GNS devices. The load balancer presents a virtual address to the computing host, and distributes traffic from the computing host to the GNS devices through the storage-side ports.

Certain embodiments of the invention may provide one or more technical advantages. A technical advantage of one embodiment may be that a network switch has a storage-side interface that has multiple storage-side ports that can communicate with multiple global name space (GNS) devices. Another technical advantage of one embodiment may be that the network switch may include a load balancer that presents a virtual address to a computing host, such that the computing host need not be aware of the multiple GNS devices.

Another technical advantage of one embodiment may be that each GNS device may have a shared IP address that is the same for the GNS devices. The load balancer presents the shared IP address to the computing host. Another technical advantage of one embodiment may be that each GNS device has a unique IP address that uniquely identifies the GNS devices from each other. The load balancer may distribute traffic from the computing host to the GNS devices using the unique IP addresses.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
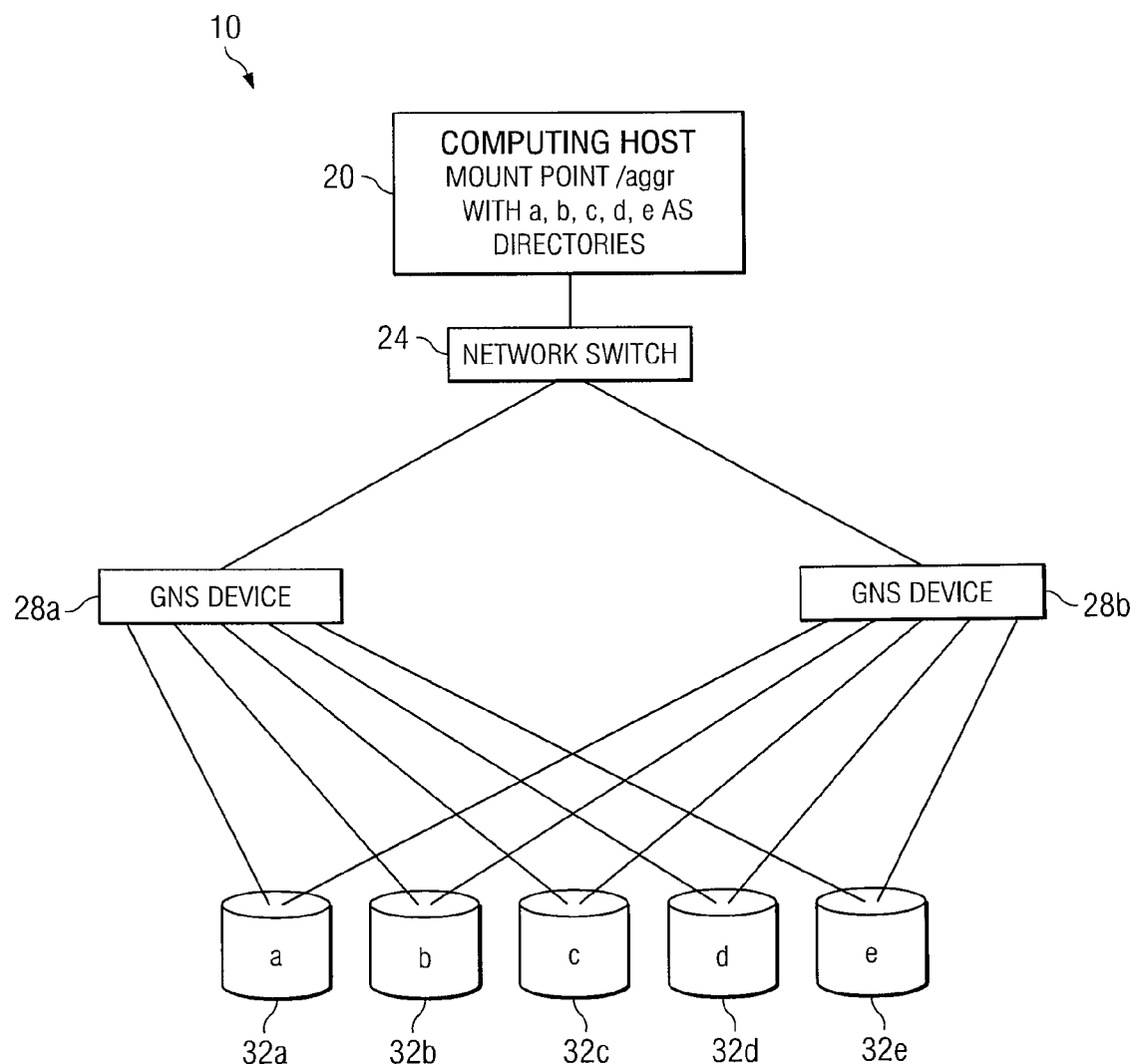
FIG. 1 illustrates an example embodiment of a system that allows a computing host to use a plurality of file systems.
Figure 2:
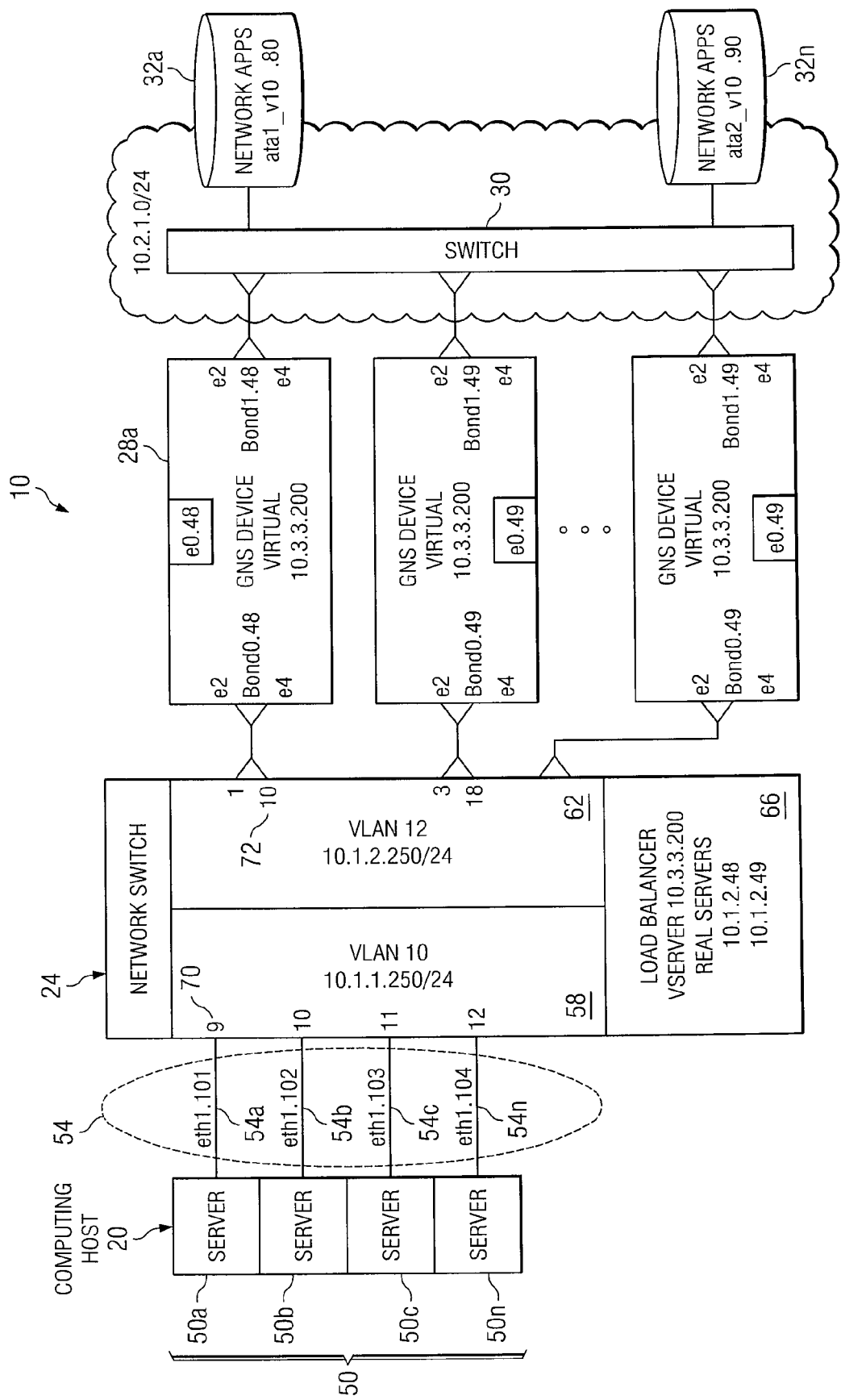
FIG. 2 illustrates another example embodiment of a system that allows a computing host to use a plurality of file systems.

Embodiments of the present invention and its advantages are best understood by referring to FIGS. 1 and 2 of the drawings, like numerals being used for like and corresponding parts of the various drawings.

FIG. 1 illustrates an example embodiment of a system 10 that allows a computing host 20 to use a plurality of file systems 32. In the illustrated embodiment, system 10 includes a computing host 20, a network switch 24, a plurality of global namespace (GNS) devices 28 (28a and/or b), and a plurality of file systems 32 (32a, b, . . . , and/or e). In particular embodiments, network switch 24 includes a load balancer that distributes traffic to GNS devices 28.

In particular embodiments, file systems 32 represent hardware and/or software that store, organize, manipulate, navigate, access, and/or retrieve computer files and the data of the files so that they may be easily accessed. File systems 32 may be stored in memory. Examples of file systems 32 include disc file systems, network file systems, and special purpose file systems.

A file system 32 may have a mount point. A mount point is the location in an operating system directory structure where a mounted file system appears. In the illustrated example, file systems 32a, 32b, . . . , 32e have mount points /a, /b, . . . , /e, respectively.

In particular embodiments, a GNS device 28 aggregates file systems 32, which may be disparate and/or remote. GNS device 28 aggregates the mount points of file systems 32 as an aggregated mount point. In the illustrated embodiment, a GNS device 28 may aggregate mount points /a, /b, . . . , /e to an aggregated mount point /aggr, with /a, /b, . . . , /e as directories.

A GNS device 28 may be configured to have any suitable address. For example, each GNS device 28 have a shared IP address and/or a unique IP address. A shared IP address may be same for some or all GNS devices 28. A unique IP address may uniquely identify each GNS device 28 from the other GNS devices 28.

In particular embodiments, network switch 24 represents any suitable switch that connects network segments. Network switch 24 may operate according to any suitable protocol, for example, Ethernet protocols. Network switch may provide any suitable functions, for example, firewall, content switching, wireless network, network analysis, intrusion detection, anomaly detection, virtual private network, and/or any other suitable functions.

In particular embodiments, network switch 24 includes a host-side interface, a storage-side interface, and a load balancer. The host-side interface has host-side ports configured to communicate with computing host 20, and the storage-side interface has storage-side ports configured to communicate with GNS devices 28. The ports may include any suitable arrangement of hardware and/or software to communicate with respective devices.

The load balancer is configured to present a virtual address to computing host 20, and to distribute traffic from computing host 20 to GNS devices 28 through the storage-side ports. In the illustrated embodiment, network switch 24 presents the aggregated mount point/aggr with /a, /b, . . . , /e as directories to computing host 20. Network switch 24 is described in more detail with reference to FIG. 2.

In particular embodiments, computing host 20 represents any suitable device that can access and use file systems 32.

Examples of computing host 20 include computing systems such as servers (for example, blade servers), computers (for example, personal computers), and/or other suitable device configured to access and use file systems 32.

Computing host 20 sees file systems 32 as having an aggregated mount point. In the illustrated example, computing host 20 sees aggregated mount points/aggr with /a, /b, . . . , /e as directories.

Any component of system 10 (for example, network switch 24 and/or GNS devices 28) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media or other memory and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" refers to each member of a set or each member of a subset of a set.

Modifications, additions, or omissions may be made to the examples of methods described herein without departing from the scope of the invention. The method may include more, fewer, or other steps. Additionally, steps may be performed in any suitable order.

FIG. 2 illustrates another example embodiment of system 10 that allows computing host 20 to use plurality of file systems 32. In the illustrated embodiment, system 10 includes computing host 20 (with servers 50), links 54, network switch 24, GNS devices 28, a switch 30, and file systems 32. Switch 30 switches traffic between GNS devices 28 and file systems 32.

In the illustrated embodiment, computing host 20 includes servers 50 (50a, b, . . . , and/or n). Servers 50 may represent blade servers. Links 54 (54a, b, and/or n) may couple host to network switch 24 and may represent Ethernet links.

In particular embodiments, network switch 24 includes a host-side interface 58, a storage-side interface 62, and a load balancer 66. Host-side interface 58 may comprise a network interface card such as an Ethernet interface card. Host-side interface 58 includes a plurality of host-side ports 70 configured to communicate with computing host 20.

In particular embodiments, host-side interface 58 may communicate with computing host 20 using a persistent path. A persistent path may be a sticky path that is configured to exist for multiple communication sessions. Host-side interface 58 presents a virtual local area network (VLAN) address to computing host 20. For example, the address may be 10.1.1.250/24.

In particular embodiments, storage-side interface 62 may be a network interface for attached storage. Storage-side interface 62 presents a VLAN address to GNS devices 28. For example, the address may be 10.1.2.250/24. Storage-side interface 62 includes a plurality of storage-side ports 72 configured to communicate with the GNS devices 28.

In particular embodiments, load balancer 66 is configured to present a virtual address to computing host 20, and may present the mount points of the file systems as a plurality of directories of the aggregated mount. In particular embodiments, load balancer 66 may be configured facilitate opening a persistent path with computing host 20. For example, load balancer 66 may facilitate opening a connection to computing host 20 and acquire a file descriptor. Load balancer 66 may configure traffic to use the same path. In particular embodiments, load balancer 66 may distribute the traffic from the computing host to the GNS devices using the unique IP addresses.

In particular embodiments, load balancer 66 presents a virtual server address to computing host 20 and GNS devices 28. For example, the address may be 10.3.3.200, and the real server addresses maybe 10.1.2.48 and 10.1.2.49. The shared addresses of GNS devices 28 may be virtual addresses 10.3.3.200.

GNS devices 28 may be configured to be aware of the same file systems 32. That is, GNS devices 28a, 28b, 28n may be configured to recognize file system 32a, 32b, . . . , 32n. GNS devices 32 may be configured to aggregate the mount points from file systems 32 in the same manner. In the illustrated example, each GNS device 28a may be configured to aggregate directories of file systems 32 into a single aggregated mount point.

Any component of system 10 (for example, network switch 24, GNS devices 28, host-side interface 58, storage-side interface 62, and/or load balancer 66) may include an interface, logic, memory, and/or other suitable element.

Certain embodiments of the invention may provide one or more technical advantages. A technical advantage of one embodiment may be that a network switch has a storage-side interface that has multiple storage-side ports that can communicate with multiple global name space (GNS) devices. Another technical advantage of one embodiment may be that the network switch may include a load balancer that presents a virtual address to a computing host, such that the computing host need not be aware of the multiple GNS devices.

Another technical advantage of one embodiment may be that each GNS device may have a shared IP address that is the same for the GNS devices. The load balancer presents the shared IP address to the computing host. Another technical advantage of one embodiment may be that each GNS device has a unique IP address that uniquely identifies the GNS devices from each other. The load balancer may distribute traffic from the computing host to the GNS devices using the unique IP addresses.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   a plurality of global namespace (GNS) devices, the GNS devices configured to aggregate a plurality of mount points of a plurality of hardware file systems as an aggregated mount point, each mount point of a hardware file system being a location in an operating system directory structure where a mounted file system appears; and
   a network switch comprising:
      a host-side interface comprising one or more host-side ports configured to communicate with a computing host;
      a storage-side interface comprising a plurality of storage-side ports configured to communicate with the GNS devices; and a load balancer configured to:
         present a virtual address to the computing host;
         present the aggregated mount point to the computing host, the aggregated mount point presented with the mount points of the plurality of hardware filing systems as a plurality of directories; and
         load balance traffic among the GNS devices to distribute the traffic from the computing host through the storage-side ports to the GNS devices and then to the plurality of hardware filing systems.

2. The system of claim 1: each GNS device having a shared Internet Protocol (IP) address that is the same for the GNS devices; and the load balancer configured to present the shared IP address to the computing host.

3. The system of claim 1: each GNS device having a unique IP address uniquely identifying the each GNS device; and the load balancer configured to distribute the traffic from the computing host to the GNS devices using the unique IP addresses.

4. The system of claim 1, the host-side interface configured to communicate with the computing host using a persistent path.

5. The system of claim 1, the load balancer configured to present the virtual address as a plurality of directories of the aggregated mount.

6. The system of claim 1, each GNS device configured to recognize and access the plurality of hardware file systems.

7. The system of claim 1, the host-side interface configured to present a virtual local area network (VLAN) address to the computing host.

8. The system of claim 1, the storage-side interface configured to present a virtual local area network (VLAN) address to the GNS devices.

9. An apparatus comprising:
   a host-side interface comprising one or more host-side ports configured to communicate with a computing host;
   a storage-side interface comprising a plurality of storage-side ports configured to communicate with a plurality of global namespace (GNS) devices, the GNS devices configured to aggregate a plurality of mount points of a plurality of hardware file systems as an aggregated mount point, each mount point of a hardware file system being a location in an operating system directory structure where a mounted file system appears; and
   one or more non-transitory computer readable media comprising code for a load balancer when executed configured to:
      present a virtual address to the computing host;
      present the aggregated mount point to the computing host, the aggregated mount point presented with the mount points of the plurality of hardware filing systems as a plurality of directories; and
      load balance traffic among the GNS devices to distribute the traffic from the computing host through the storage-side ports to the GNS devices and then to the plurality of hardware filing systems.

10. The apparatus of claim 9: each GNS device having a shared Internet Protocol (IP) address that is the same for the GNS devices; and the load balancer configured to present the shared IP address to the computing host.

11. The apparatus of claim 9: each GNS device having a unique IP address uniquely identifying the each GNS device; and the load balancer configured to distribute the traffic from the computing host to the GNS devices using the unique IP addresses.

12. The apparatus of claim 9, the host-side interface configured to communicate with the computing host using a persistent path.

13. The apparatus of claim 9, the load balancer configured to present the virtual address as a plurality of directories of the aggregated mount.

14. The apparatus of claim 9, each GNS device configured to recognize and access the plurality of hardware filing systems.

15. The apparatus of claim 9, the host-side interface configured to present a virtual local area network (VLAN) address to the computing host.

16. The apparatus of claim 9, the storage-side interface configured to present a virtual local area network (VLAN) address to the GNS devices.

17. A method comprising:
   communicating with a computing host through one or more host-side ports of a host-side interface;
   communicating with a plurality of global namespace (GNS) devices through a plurality of storage-side ports of a storage-side interface, the GNS devices configured to aggregate a plurality of mount points of a plurality of hardware file systems as an aggregated mount point, each mount point of a hardware file system being a location in an operating system directory structure where a mounted file system appears;
   presenting, by a load balancer, a virtual address as a plurality of directories of the aggregated mount to the computing host;
   presenting the aggregated mount point to the computing host, the aggregated mount point presented with the mount points of the hardware filing systems as a plurality of directories; and
   load balancing traffic among the GNS devices to distribute the traffic from the computing host through the storage-side ports to the GNS devices and then to the plurality of hardware filing systems.

18. The method of claim 17, further comprising: presenting a shared Internet Protocol (IP) address to the computing host, the shared IP address being the same for the GNS devices.

19. The method of claim 17, further comprising: distributing the traffic from the computing host to the GNS devices using a plurality of unique IP addresses, each unique IP address uniquely identifying a GNS device.

20. The method of claim 17, further comprising: communicating with the computing host using a persistent path.

* * * * *